United States Patent

Kaufman

[15] 3,637,129

[45] Jan. 25, 1972

[54] DESOLDERING TOOL

[72] Inventor: Harry Kaufman, New Rochelle, N.Y.

[22] Filed: Apr. 16, 1970

[21] Appl. No.: 29,067

[52] U.S. Cl. ............................228/20, 219/229, 228/51
[51] Int. Cl. ..................................................B23k 1/00
[58] Field of Search ............228/19, 20, 51, 52; 219/229, 219/236, 237; 126/236

[56] References Cited

UNITED STATES PATENTS

| 2,826,667 | 3/1958 | Brillinger | 219/21 |
| 3,469,759 | 9/1969 | Wansink | 228/20 |
| 3,484,033 | 12/1969 | Sachs | 228/51 |

Primary Examiner—John F. Campbell
Assistant Examiner—R. J. Craig
Attorney—Jack Oisher

[57] ABSTRACT

The disclosure describes a desoldering tool of simple construction whose active tip, which is heated by a coil, is mounted on a solder-conducting tube in turn mounted on a heat-insulating tube which leads to a suction-creating assembly of the dashpot-type having a wide bore and an outer displaceable housing sealed by gaskets to the tool interior. When a pistol gain is squeezed, the housing is displaced increasing the interior volume and creating a suction at the heated tip capable of sucking in molten solder. A modification uses air pressure to actuate the displaceable housing.

13 Claims, 7 Drawing Figures

INVENTOR.
HARRY KAUFMAN

BY

ATTORNEY

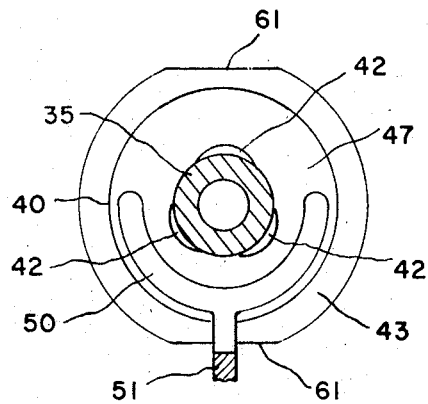
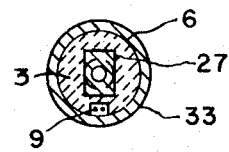
Fig. 2
Fig. 3
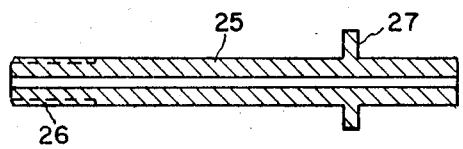
Fig. 4
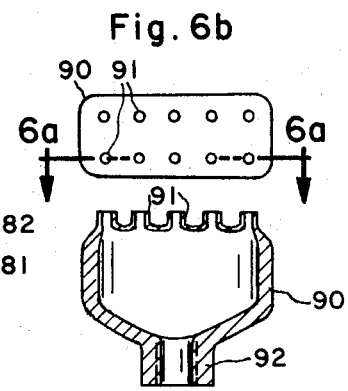
Fig. 6b
Fig. 6a
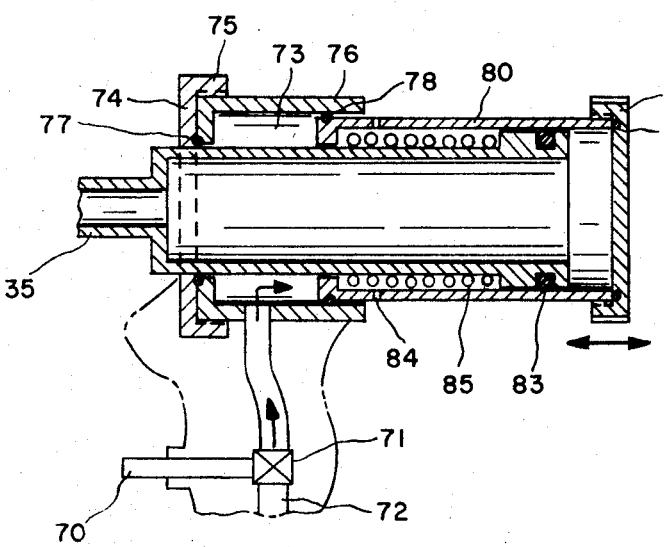
Fig. 5

DESOLDERING TOOL

This invention relates to a desoldering gun, that is, a tool or device for melting and removing fusible metal.

Electrical appliances and apparatus frequently employ a body of relatively low melting solder to form electrical connections between wires, or to mount and connect electrical components to terminals. When it becomes necessary to repair or reconstruct such apparatus, it is necessary to melt the solder at the connection, and it often becomes desirable to remove the solder melt for ease of disassembling the connection, or to avoid a short circuit. Tools for doing this are available, but they exhibit one or more of the following shortcomings, too expensive, too large, too heavy, poor performance, or requires two hands to operate.

An object of the present invention is an improved desoldering tool.

Another object is a desoldering tool of relatively low cost and simple construction yet capable of carrying out in an efficient manner the function of melting and removing a mass of solder.

Still another object is a desoldering tool that is light weight, of small size and easily operated with one hand.

A further object is a desoldering tool of simple construction providing a removable heating tip and easy removal of the solder bits formed when the solder mass melted and removed from the connection rehardens.

These and other objects of the invention are achieved with a tool construction in the form of a handgun having a heat insulating tube on which is assembled at one end in a novel manner a heat-conducting hollow metal tip and a solder-conducting tube, which tubes are connected in a substantially airtight manner to what may be described as a suction dashpot assembly at the opposite end, means being provided on the gun handle to activate the dashpot and create a suction capable of removing the solder melt formed by the heated tip.

Other objects and a fuller understanding of this invention may be had by referring to the following detailed description of several exemplary embodiments thereof taken in conjunction with the accompanying drawing wherein:

FIG. 2 is a cross-sectional view along the line 2—2 of the tool illustrated in FIG. 1;

FIG. 3 is a cross-sectional view along the line 3—3 of the tool shown in FIG. 1;

FIG. 4 is an enlarged cross-sectional view of the solder-conducting tube used in the embodiment of FIG. 1;

FIG. 5 is a partial cross-sectional view of the handle and suction producing end of a modification;

FIGS. 6a and 6b are cross-sectional and top views, respectively, of a modified heating tip for the tool of FIG. 1.

Figure 1:
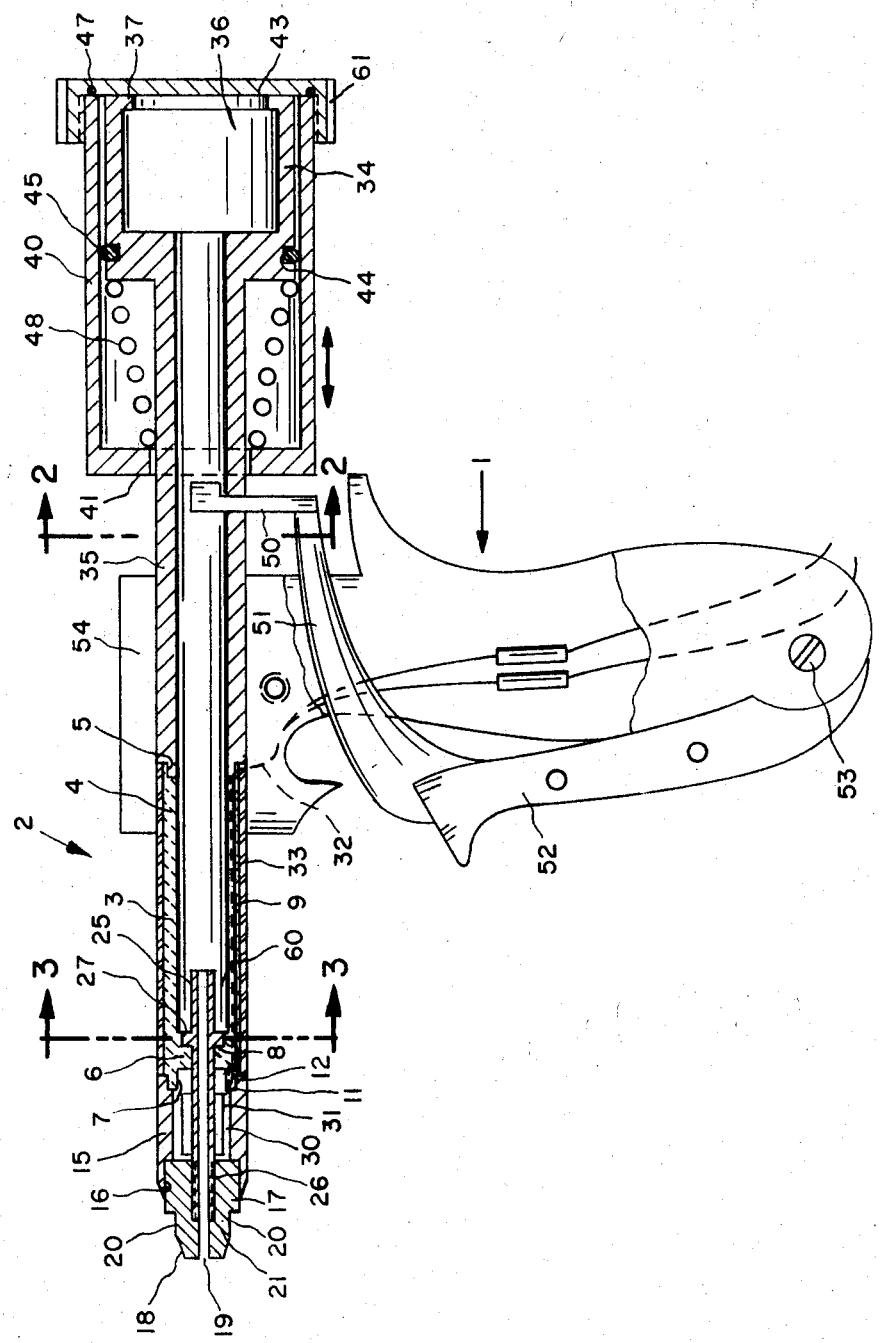
FIG. 1 is a side, cross-sectional view of one form of desoldering tool in accordance with my invention.

Referring now to FIGS. 1–4, which illustrate one preferred form of desoldering tool in accordance with the invention, the tool shown is in the form of a handgun having a handle 1 supporting a nozzlelike tubular element 2. The nozzle end 2 comprises a heat-insulating tube 3, for example of ceramic material, in the form of a hollow cylindrical part 4 having a recessed end 5 and forming a reentrant portion 6 defining a cylindrical receiving end 7 on one side and a rectangular recess 8 on the opposite side, and further including along the bottom a channel or slot 9 running from the cylindrical receiving end 7 along the full length of the tube to its opposite end 5. The cylindrical receiving end 7 is provided with an annular shoulder 11 defining an annular outer recess 12. This outer recess 12 is dimensioned to accommodate a cylindrical heat shield 15, for example of a relatively poor heat-conducting metal such as steel. The heat shield 15 in turn has an inner annular recess 16 to accommodate a cylindrical removable heating tip 17 of good heat conducting metal, such as for example copper or nickel-plated copper. The tip 17 has a tapered front 18 containing a through orifice 19 and is also provided with flats 20 for receiving a wrench. The orifice 19 opens into a larger threaded bore 21.

The heat-insulating tube 3, the heat shield 15 and the tip 17 are united by a hollow solder-conducting tube 25, for example of steel, having a threaded end 26 engaged by the threaded bore 21 of the tip, and a flattened shoulder 27 dimensioned to fit within the rectangular recess 8 on the backside of the reentrant portion 6 of the heat-insulating tube 3. An enlarged cross-sectional view is shown in FIG. 4. The heat shield 15 forms on its interior a cavity 30 for accommodating an electrical heating element or coil 31 whose wires 32 pass through the channel 9 in the heat-insulating tube 3 and from there into the interior of the handle 1, which is hollow.

To assemble the components so far described, the solder conducting tube 25 is pushed through the hole in the reentrant portion 6 of the heat-insulating tube 3, the heating coil placed on the latter and the wires 32 located in the slot 9, the heat shield 15 seated on the recess 12 of the heat-insulating tube 3, and then the tip 17 screwed onto the threaded end 26 of the solder-conducting tube 25. The flattened shoulder 27 of the solder-conducting tube 25, which seats in the recess 8 of the heat-insulating tube 3, prevents the tube 25 from rotating. It may be permanently secured by applying some high-temperature adhesive between the shoulder 27 and the recess 8. The dimensions are chosen such that the tightening of the tip 17 on the threaded end 26 of the solder-conducting tube 25 clamps the tip to the heat shield 15 and the latter to the heat-insulating tube 3 forming a relatively airtight joint connecting the orifice 19 through the hollow solder-conducting tube 25 to the interior of the heat-insulating tube 3. As will be evident, the tip 17 is easily removed and replaced by a different tip should this become necessary or desirable.

Over the heat-insulating tube 3 is slipped a metal sleeve 33, for example of aluminum, to retain the wires 32 in the slot 9. To the recessed end 5 of the heat-insulating tube 3 is secured a second cylindrical tube 35, for example of aluminum, whose remote end widens 34 to form a solder-collecting cavity 36. The end of the second tube 35 has a small reentrant portion 37 to prevent solder from passing out of the cavity 36 during handling of the tool. Over the remote end 34 of the second tube 35 is provided a displaceable housing member 40 comprising a reentrant portion 41 having an aperture—in the case shown three apertures 42—affording clearance for air to pass into and out of the housing member 40. The opposite end is closed off by a threaded removable cap 43. A annular recess 44 is provided in the enlarged part 34 of the second tube 35 to receive a sealing gasket, such as an O-ring 45, for sealing in a substantially airtight manner the interior of the tube 35. The O-ring 45 engages the interior of the housing 40 sealing same while allowing horizontal reciprocation of the housing. The cap 43 is sealed to the end of the housing 40 by another gasket 47 located outwardly of the reentrant end 37. This gasket 47 may also be an O-ring. A compression spring 48 is located around the second tube 35 between the reentrant end 41 and the widened portion 34 of the second tube 35. The spring 48 urges these members apart into the position shown in the drawing. Coupled to the outer front surface of the housing reentrant end 41 is a U-shaped yoke 50 whose bottom end is mechanically coupled via a connecting piece 51 to a finger-gripping member 52 whose bottom end is pivoted 53 at the bottom end of the handle 1. The handle 1 may comprise two plastic pieces, having the shape illustrated, whose top portion clamps 54 over the assembled sleeve 33 surrounded heat-insulating tube 3 and second tube 35, and whose interior is hollow to allow for passage of the heating element wires 32 and to allow for movement of the finger-gripping member 52 and connecting piece 51 when pressed or pulled by the hand of the user.

As will be evident from the foregoing description, the entire interior of the nozzle 2 from the tip orifice 19 all the way through the solder conducting tube 25, the second tube 35 to causing a cap 43 form a substantially airtight chamber whose only outside access is via the orifice 19. This chamber contains a certain volume. When the housing 40 closed by the cap 43 is displaced to the right against the action of the spring 48, that chamber volume is substantially increased in size, causing a partial vacuum which creates suction at the orifice 19 of the heating tip 17.

In operation, the wires 32 are connected to a suitable source of electrical power causing the coil 31 to develop heat until the tip 17 reaches a temperature capable of melting solder. The operator, holding the gun in one hand by the handle 1, with the finger grip 52 released, applies the heated tip 17 to the solder joint. When the solder melts, observed visually by the operator, the finger grip 52 is squeezed, displacing the yoke 50 to the right and displacing by the same distance to the right the housing 40, creating a suction pulling the molten solder through the orifice 19 and through the solder-conducting tube 25, which being hot prevents the solder from solidifying, until it drops into the heat-insulating tube 3 where it solidifies into small particles. The solder-conducting tube end 25 which projects within the heat-insulating tube 3 is thus spaced 60 from the interior wall of the latter thereby preventing the solder chips from reentering the tube 25 when the gun is pointed downward. The close proximity of the coil 31 to the tip 17 and the solder-conducting tube 25 maintains these elements at solder-melting temperature and prevents the orifice 19 and hollow tube 25 from clogging up with solidified solder. On the other hand, the heat insulating tube 3 keeps the heat away from the handle 1 and dashpot assembly at the rear, which remains relatively cool. When the molten solder has been removed, the gun is removed from the joint, and the finger grip 52 released, pushing out through the orifice 19 the extra air accumulated in the interior chamber. If the gun is pointed upward, the solder chips will fall back into the chamber 36. The reentrant portion 37 will tend to prevent the chips from reaching the O-rings 45 and 47 and interfering with their operation. When desired, the cap 43 may be removed and the solder chips collected readily removed. For this purpose, wrench flats 61 may be provided on the cap 43.

One of the features of the invention is to create the suction, instead of by a piston moving within a cylinder, by the dashpot arrangement described, in which the suction tube 35 is enlarged to form a large bore section 34 and displacing an outer housing member 40 acting as a cylinder to increase the volume and create the suction. Due to the wide bore section 34, only a short stroke of the housing 40 is required to establish the desired large volume change and create the desired reduced pressure. With small bore pistons, much longer strokes are necessary, which results in an unduly large, unwieldy tool that is more difficult to handle. Another feature is the establishment of the reduced pressure by displacement of the housing 40, the spring 48 returning it to its normal position. Thus, the operator need use only one hand, as contrasted to other tools requiring a second hand to load a spring used to drive a piston backwards. Tools requiring two hands to operate are not as suitable for production work or switchboard repair as the tool of the invention.

FIG. 5 shows a modification of the dashpot end for actuation by air pressure. The finger grip 52 is replaced by a button trigger 70 connected to a suitable air valve 71 connected at one side to an airhose 72 connected to an air compressor and at the opposite side to an annular space 73 defined by a fixed end piece 74 having a threaded shoulder 75 to which is screwed a cylindrical member 76 sealed to the end piece 74 by an annular gasket 77. The member 76 is sealed by an annular gasket 78 to a displaceable housing member 80 corresponding to the member 40 of FIG. 1. The end of the housing member 80 is closed off in an airtight manner by a gasket 81 and screwed on cap 82. The member 80 is sealed to the interior space of the tube 35 by a gasket 83. Vents 84 are provided to allow free access of air into the space surrounding a return spring 85. In operation, when the trigger 70 is pressed, the valve 71 opens and air under pressure fills the chamber 73 displacing the housing 80 to the right into the position illustrated in FIG. 5. This creates the desired suction. When the trigger is released, the air in the chamber 73 vents to the outside through the valve 71 and the spring 85 returns the housing 80 to the left to its normal position. While FIG. 5 discloses a single annular cylinder for actuating by air pressure the dashpot 80, it will be appreciated that one or several smaller air cylinders can be mounted on the tube 35 for actuating the dashpot 80 in a similar manner.

The heating tip 17 can be replaced by tips having a different configuration to match the particular article to be desoldered. For instance, FIGS. 6a and 6b illustrate a tip useful for desoldering a component having 10 terminals, as found, for instance, on an integrated circuit component. Instead of a single orifice, the tip 90 has 10 pierced protuberances 91 aligned in two rows opposite the threaded end 92 for mounting on the solder tube 25. This enables a suction to be created simultaneously at 10 points for removing a 10-pin component. Tips with different numbers of suction points are readily provided within the principles of the invention.

As will be clear from the foregoing description, the invention provides an inexpensive, small, lightweight and thus non-tiring handtool for melting and removing solder and which can be operated by one hand, and offering the further feature of a readily interchangeable tip. While I have described my invention in connection with specific embodiments and applications, I wish it to be understood that I do not intend to be limited thereby as various other modification will readily suggest themselves to those skilled in this art without departing from the spirit of my invention.

I claim:

1. A desoldering tool comprising a hollow nozzle-shaped member comprising a heat-conducting tip having an orifice communicating with the nozzle interior, means for heating the tip, and means coupled to the nozzle interior for establishing a reduced pressure therein; said reduced pressure-establishing means comprising a member connected to the nozzle and having an enlarged bore portion relative to that of the nozzle and an open end, displaceable means surrounding the enlarged bore portion and closing off the open end and displaceable relative to the open end to increase the bore volume, and means under operator control for displacing the displaceable means to increase the bore volume and create a suction at the tip orifice.

2. A tool as set forth in claim 1 wherein means are provided for sealing in a substantially airtight manner the displaceable member to the enlarged bore portion.

3. A tool as set forth in claim 2 wherein the sealing means comprises O-ring mounted on the outside of the enlarged bore portion and engaged by the inside surface of the displaceable means.

4. A tool as set forth in claim 3 and comprising return spring means on the outside of the nozzle between the enlarged bore portion and a reentrant portion of the displaceable means remote from the open end.

5. A tool as set forth in claim 4 and comprising a removable cap sealingly engaging the end of the displaceable member remote from its reentrant portion.

6. A tool as set forth in claim 5 wherein the enlarged bore portion has a reentrant portion at its open end, and the displaceable means comprises mechanical means coupled to the displaceable member and adapted upon being squeezed by the operator to displace same.

7. A desoldering tool comprising a hollow nozzlelike member having a heat-insulating tubular portion, a solder-conducting tube mounted on the heat-insulating portion and having an end projecting forwardly; an electrical heater mounted on the forwardly projecting end of the solder-conducting tube, a heat-conducting tip removably mounted on the end of the solder-conducting tube and having an orifice communicating with the tube interior, said solder-conducting tube interior communicating with the interior of the heat-insulating portion, and means for establishing a reduced pressure within the nozzle interior to create a suction at the tip orifice.

8. A tool as set forth in claim 7 wherein a cylindrical member of relatively poor heat-conduction surrounds the coil and abuts against the heat-insulating portion and the tip, the tip being screwed onto the end of the solder-conducting tube.

9. A tool as set forth in claim 8 wherein the heat-insulating portion has a reentrant portion having a substantially rectangular recess on the side remote from the tip and an annular shoulder on the side adjacent the tip for receiving the cylindrical member.

10. A tool as set forth in claim 9 wherein the solder-conducting tube has a flattened shoulder adapted to seat in the rectangular recess and a tubular portion projecting in a direction opposite to the tip within the heat-insulating portion and spaced from its walls.

11. A desoldering tool as set forth in claim 4 wherein the displaceable means comprises an air vent leading into the area containing the spring.

12. A desoldering tool as set forth in claim 1 wherein the operator control means comprises an air cylinder coupled to the displaceable means and means for introducing air under pressure into the air cylinder.

13. A tool as set forth in claim 1 and including means for resiliently urging the displaceable means in a direction reducing the bore volume.

* * * * *